(12) United States Patent
Matsumura

(10) Patent No.: US 8,416,469 B2
(45) Date of Patent: Apr. 9, 2013

(54) IMAGE PROCESSING APPARATUS, IMAGE PROCESSING METHOD AND COMPUTER PROGRAM

(75) Inventor: Takeshi Matsumura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 12/632,248

(22) Filed: Dec. 7, 2009

(65) Prior Publication Data
US 2010/0165420 A1   Jul. 1, 2010

(30) Foreign Application Priority Data

Dec. 26, 2008   (JP) .................................. 2008-333991

(51) Int. Cl.
*H04N 1/04* (2006.01)
*H04N 1/387* (2006.01)
*H04N 1/40* (2006.01)

(52) U.S. Cl.
USPC ........... 358/474; 358/448; 358/450; 358/443; 358/483; 358/482

(58) Field of Classification Search .................. 358/483, 358/482, 497, 494, 474, 450, 448, 443; 382/276, 382/299
See application file for complete search history.

(56) References Cited

U.S. PATENT DOCUMENTS

| | | | |
|---|---|---|---|
| 6,381,377 B1 * | 4/2002 | Wang | 382/299 |
| 7,362,480 B2 * | 4/2008 | Lien et al. | 358/497 |
| 7,426,064 B2 * | 9/2008 | Cunnigan et al. | 358/497 |
| 8,050,518 B2 * | 11/2011 | Rengakuji et al. | 382/284 |
| 8,160,351 B2 * | 4/2012 | Sandstrom et al. | 382/149 |
| 8,310,731 B2 * | 11/2012 | Nakajima | 358/447 |
| 8,315,480 B2 * | 11/2012 | Matsuzaki | 382/299 |
| 2009/0161169 A1 * | 6/2009 | Muramatsu | 358/447 |
| 2009/0284800 A1 * | 11/2009 | Misawa | 358/3.24 |
| 2009/0284805 A1 * | 11/2009 | Ichihashi | 358/448 |
| 2010/0008580 A1 * | 1/2010 | Mizuno | 382/176 |
| 2010/0053694 A1 * | 3/2010 | Tsuchida | 358/447 |
| 2010/0073732 A1 * | 3/2010 | Matsunaga | 358/447 |
| 2010/0231929 A1 * | 9/2010 | Kakigi | 358/1.2 |
| 2011/0116112 A1 * | 5/2011 | Muramatsu | 358/1.9 |
| 2011/0164258 A1 * | 7/2011 | Nakamura | 358/1.2 |

FOREIGN PATENT DOCUMENTS

| | | |
|---|---|---|
| JP | 2005-354124 | 12/2005 |
| JP | 2006-092450 | 4/2006 |

* cited by examiner

*Primary Examiner* — Cheukfan Lee
(74) *Attorney, Agent, or Firm* — Fitzpatrick, Cella, Harper & Scinto

(57) ABSTRACT

Conventionally, in the case where multiple readings of a document are carried out in order to generate an output image, image processing to a super-resolution image has been started after waiting for completion of the multiple readings necessary for giving a target resolution to the image after super-resolution processing. Therefore, a lot of time has been required for processing. In an image processing apparatus including a document reading component configured to read a plurality of image data each having a different phase from a document by a single scanning, a super-resolution processing component is configured to generate super-resolution image data by using the plurality sheets of image data each having a different phase, so as to have a resolution higher than those of the plurality of image data, and an image processing component is configured to carry out multiple image processing to the super-resolution image data. Super-resolution processing is started at the time when image data necessary for obtaining a specific resolution associated with any of the multiple image processing is obtained.

7 Claims, 16 Drawing Sheets

|  | IMAGE PROCESSING A | IMAGE PROCESSING B | IMAGE PROCESSING C |
| --- | --- | --- | --- |
| PRIORITY 1 | 600dpi | 1200dpi | 1200dpi |
| PRIORITY 2 | 300dpi | 600dpi | — |
| PRIORITY 3 | — | — | — |

FIG. 13

|  | SETTING A | SETTING B | SETTING C |
| --- | --- | --- | --- |
| 600dpi | 3 SHEETS | 10 SHEETS | 20 SHEETS |
| 1200dpi | 6 SHEETS | 20 SHEETS | 40 SHEETS |
| 2400dpi | 9 SHEETS | 30 SHEETS | 60 SHEETS |

FIG. 14

IMAGE PROCESSING APPARATUS, IMAGE PROCESSING METHOD AND COMPUTER PROGRAM

BACKGROUND OF THE INVENTION

1. Field of the Invention

The present invention relates to an image processing apparatus and an image processing method for executing copying and transmission processing by using a scanner, and a computer program.

2. Description of the Related Art

There is a technology; so called "super-resolution" for improving resolution using a plurality of images each having a certain level of resolution. The use of the technology enables conversion, for example, from an image of 600 dpi to an image corresponding to 1200 dpi, thus enabling to achieve a high resolution image by using a device which is the same as that used before.

In order to carry out a super-resolution technology, a plurality of images each having a phase differing in a sub-pixel order (unit that is smaller than one pixel) are required. Thus, the technology is widely applied to a field such as processing of moving images.

However, the need of a plurality of images for one pixel necessarily consumes more amount of a memory, thus inevitably increasing the size of the memory and the amount of calculation.

Therefore, conventionally, the reduction of the calculation amount and the consumption amount of a memory have been achieved by specifying attention areas from a low resolution input image and increasing/decreasing the number of sheets of images to be synthesized based on the sizes of the areas (for example, refer to Japanese Patent Laid-Open No. 2006-092450).

Moreover, the reduction of the calculation amount and the consumption amount of a memory have been achieved by dividing an input image into important areas and non-important areas and by reducing the number of sheets of images to be used for the non-important areas than that for the important areas (for example, refer to Japanese Patent Laid-Open No. 2005-354124).

In the above-mentioned prior-art technologies for achieving the reduction of the calculation amount and the consumption amount of a memory, the number of input images that are used for the super-resolution processing has been determined by defining important areas by a user or by automatically determining the important areas from parts having the same luminance among a plurality of images.

Although such technologies can reduce the consumption amount of a memory used for super-resolution processing itself, if any image processing is required to be carried out with respect to the super-resolution image after subjected to super-resolution processing, another countermeasure becomes necessary.

Here, the case where printing of a super-resolution image of 1200 dpi obtained by subjecting an input image of 600 dpi to super-resolution processing is performed, will be exemplified.

Conventionally, an image obtained by further carrying out super-resolution processing with respect to a super-resolution image of 1200 dpi has been output as an image suitable for an engine for printing. Here, when image processing is configured with hardware logic, logic corresponding to 1200 dpi is prepared. On the contrary, if more sheets of image data can be prepared for the super-resolution processing, an image having resolution higher than 1200 dpi (for example, 2400 dpi) can also be formed. As the hardware logic when such an image of 2400 dpi is output, logic corresponding to 2400 dpi has to be prepared.

That is, if an image subjected to super-resolution processing is required to be printed, image processing hardware logic corresponding to the output resolution of the image after super-resolution processing should be prepared. This leads to the increase of the circuit scale and the cost. As the countermeasure of this, first, a method can be considered, in which image processing is carried out with respect to a low resolution read image before super-resolution processing, and super-resolution processing is carried out with respect to the image after image processing.

However, in this case, since the number of times of image processing is the same as that of reading of a document, the degradation of the performance occurs. Although, this can be coped with by using a configuration in which a plurality of circuits are made so as to carry out processing in parallel, finally, leading to the increase of the circuit scale and the cost.

As the next countermeasure, a method can be considered, in which image processing is carried out with respect to only one reading image and the resultant image is reflected to super-resolution image data by subjecting it to processing such as resolution conversion processing. However, in this case there arises a problem in that the quality of the output image can not be ensured.

Moreover, conventionally, in the case where multiple readings of a document are carried out in order to generate an output image, the image processing with respect to the super-resolution image has been started after waiting for the completion of all of the multiple readings necessary for giving target resolution to the image after super-resolution processing.

However, in the case where the resolution for carrying out image processing is different from that for an output (for example, the case where the output resolution is higher than the former, an image having resolution sufficient for image processing can be obtained even if all the multiple reading processing has not completed. As described above, even if reading of sheets of image data that are necessary and sufficient for super-resolution processing to the resolution for image processing has already been completed, the super-resolution processing has not started until all of the multiple reading processing have been completed. As a result, many times are required by the time the subsequent image processing has been completed.

SUMMARY OF THE INVENTION

For the purpose of solving the above-mentioned problems, the present invention includes the following configuration. The image processing apparatus of the present invention comprises: a document reading component configured to read a plurality sheets of image data each having a different phase from a document by single scanning; a super-resolution processing component configured to generate super-resolution image data using the plurality sheets of image data each having a different phase, so as to have a resolution higher than those of the plurality sheets of image data; and an image processing component configured to carry out multiple image processing to super-resolution image data, wherein each of the multiple image processing is associated with a specific resolution, and the super-resolution processing component starts super-resolution processing at the time when image data necessary for obtaining the specific resolution associated with any of the multiple image processing is obtained.

According to the present invention, a MFP configured to carry out super-resolution processing by acquiring a plurality sheets of image data each having a different phase can enhance the timing of starting super-resolution processing and that of starting image processing. This enables the improvement of the performance of the MFP.

Moreover, it is also possible to achieve high quality image processing while preventing the increase in the amount of circuit usage by carrying out super-resolution processing with respect to resolution suitable for image processing at a stage when the resolution is obtained, independently of the output resolution.

Further features of the present invention will become apparent from the following description of exemplary embodiments (with reference to the attached drawings).

BRIEF DESCRIPTION OF THE DRAWINGS

FIG. 13 illustrates an example of a table referred in acquiring target resolution when carrying out super-resolution processing according to the embodiment of the present invention;

FIG. 14 illustrates an example of a table referred in setting target number of sheets when carrying out super-resolution processing according to the embodiment of the present invention;

DESCRIPTION OF THE EMBODIMENTS

Embodiment

An embodiment of the present invention will be described.

Figure 1:
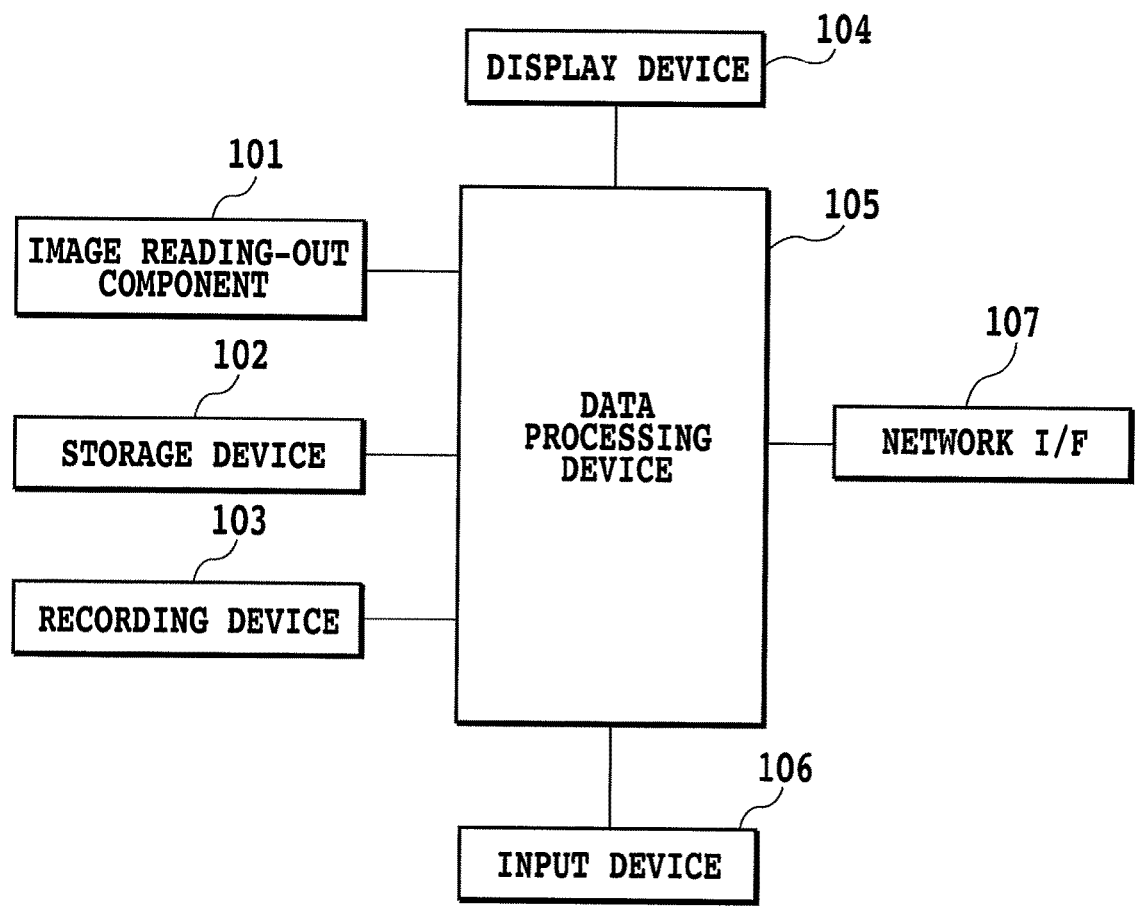
FIG. 1 illustrates a configuration of an MPF according to one embodiment of the present invention.

FIG. 1 is a configuration view of a so-called MFP (Multi Function Peripheral). An image reading component 101 is, for example, a scanner including an ADF (Auto Document Feeder), in which a bundle of or a sheet of document is irradiated with a light source (not illustrated in the figure), the reflection image of the document is formed on a solid-state image sensing element such as a CCD sensor, and raster-shaped read image signals are obtained as image information from the solid-state image sensing element. In an MPF or the like, including a color scanner thereon, an RGB color image is obtained by attaching three kinds of color filters to the solid-state image sensing element.

A recording device 103 is, for example, a printer. When a copying function of the MFP is performed, the image signals are subjected to image processing so as to be recording signals by a data processing device 105, and sequentially output on the recording device 103 so as to form an image on a sheet of paper. The recording device 103 image performs image forming on the data processed by the data processing device and output the image. The data processing device 105 will be described later.

Instructions from an operator to the MFP are carried out through an input device 106 that is a key operation component provided in the MFP, and these series of operation are controlled by a control component 1205 in the data processing device 105.

On the other hand, displaying of operation input status and displaying of image data under processing are carried out in a display device 104. Moreover, a storage device 102 is a storage area such as an SDRAM and HDD, capable of storing image data and the like captured by the image reading component 101.

A network I/F 107 is an interface for connecting to a network. By using this, the data processing device 105 can receive image data from PC etc. to process the data, and the recording device 103 can print the processed data. Moreover, it is also possible to transmit data, read by the image reading component 101 and processed by the data processing device 105 to PC etc. via the network I/F 107.

Figure 12:
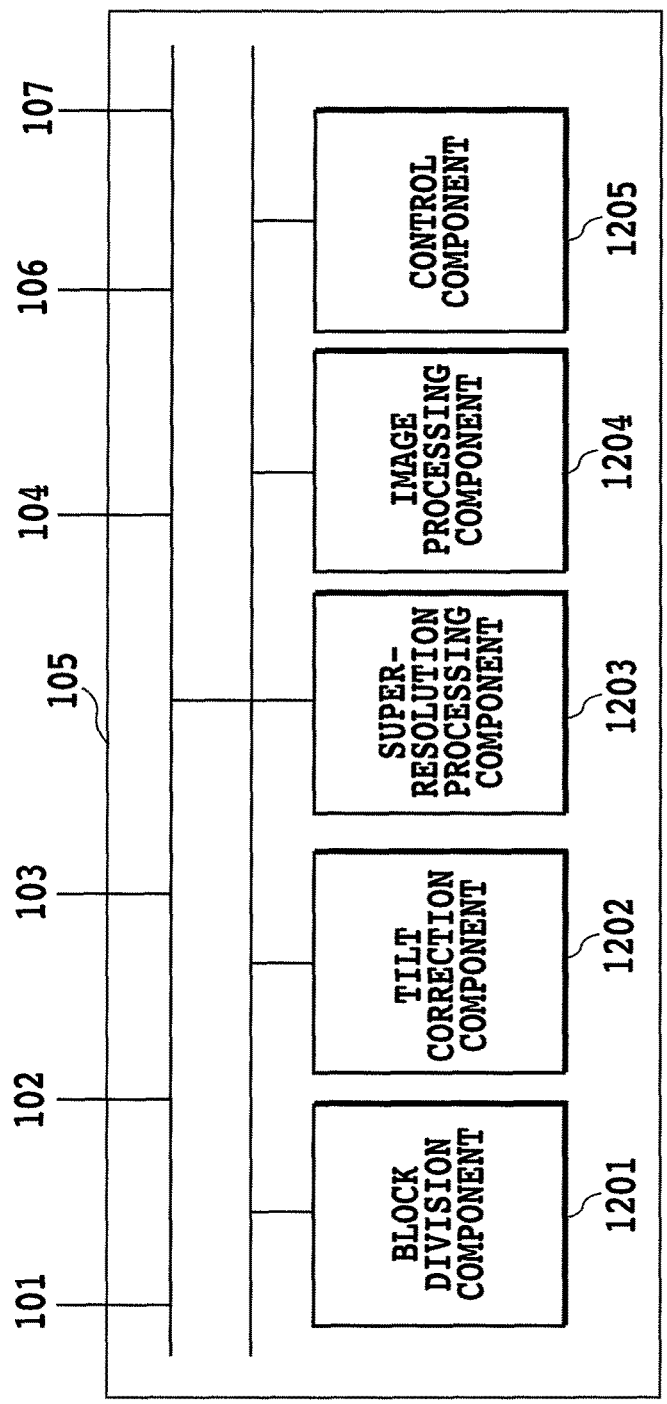
FIG. 12 is a detailed view illustrating a data processing apparatus inside the MFP according to the embodiment of the present invention.

FIG. 12 is a detailed view illustrating the data processing device 105, which includes the following processing components. Reference numeral 1201 represents a block division component, which carries out processing of dividing image data read by a scanner etc. into blocks. Reference numeral 1202 represents a tilt correction component, which carries out processing of correcting tilting of tilt image data to be horizontal. Reference numeral 1203 represents a super-resolution processing component, which carries out super-resolution processing with respect to low resolution image data, processing for generating high resolution image data, and processing that is necessary and associated with the processing. Reference numeral 1204 represents an image processing component, which carries out area separation processing, color/monochrome determination processing, color space transformation processing, error diffusion processing, scaling processing, synthesis processing, and screen processing, and various types of image processing, such as, gamma processing, filter processing, compression processing, and half-tone processing. In the present embodiment, the above-mentioned types of processing can be carried out with respect to image data subjected to super-resolution processing.

Next, specific types of processing of the present embodiment will be described.

Figure 2:
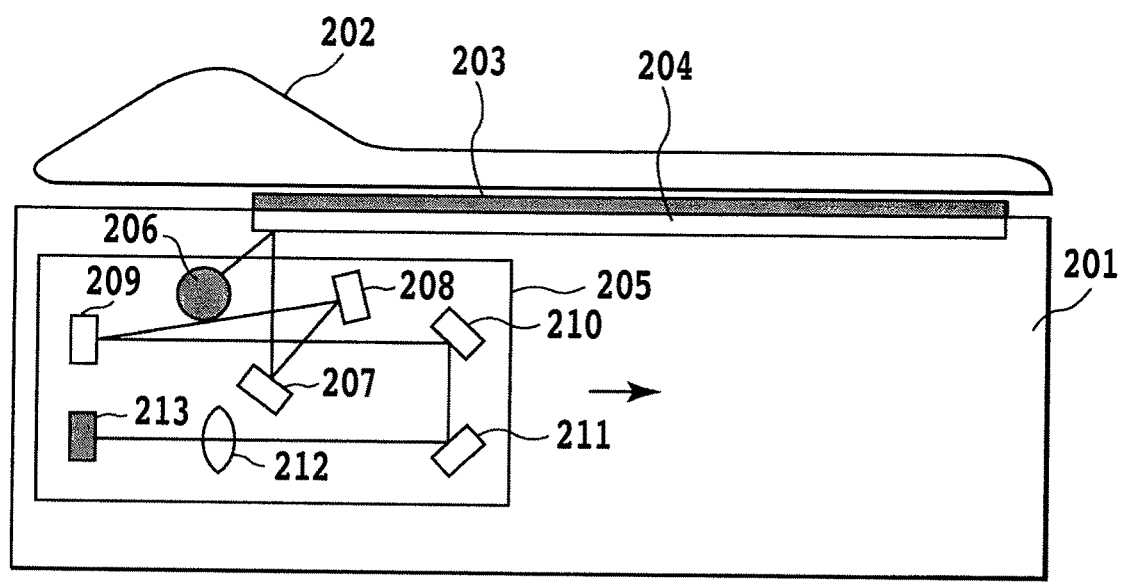
FIG. 2 illustrates an image reading component of the MPF according to the embodiment of the present invention.

FIG. 2 illustrates one example of an image reading component 101 of an MFP according to the present embodiment, in which reference numeral 201 represents a reading component. Reference numeral 202 represents ADF, which has a function of confining a document 203 and feeding it to a document reading position during skimming through the document. Reference numeral 204 is a glass plate for placing the document 203 thereon during reading a platen. Reference numeral 205 represents a document reading component including a reading device for reading the document 203, and a device for imaging the document. Reference numeral 206 is a light source, for which a white light source such as a xenon tube is used. Reference numerals 207 to 211 are mirrors, which have a function of transmitting the reflected light of light radiated from the light source onto the document, to an image sensing element 213. Reference numeral 212 represents a lens for collecting the reflected light of image data in the width of the image sensing element 213.

Figure 3:
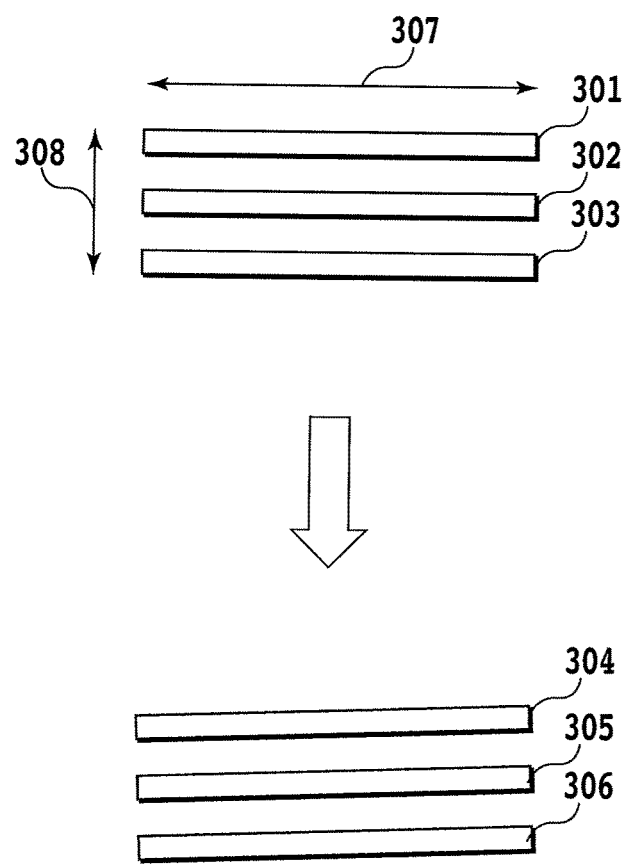
FIG. 3 is a detailed view of an image sensing element in the image reading component according to the embodiment of the present invention.

FIG. 3 is a detailed view illustrating the above-mentioned image sensing element 213. Reference numerals 301, 302 and 303 are optical sensors, from which image data of one line of main-scanning is obtained, respectively. Reference numerals 307 and 308 represent a main-scanning direction, and a sub-scanning direction, respectively. Although, usually, sensors are arranged so as to be in parallel with ground, an image is obtained while tilting the sensors, in the present embodiment. Reference numerals 304, 305 and 306 represent each of the tilt sensors, respectively.

Figure 4:
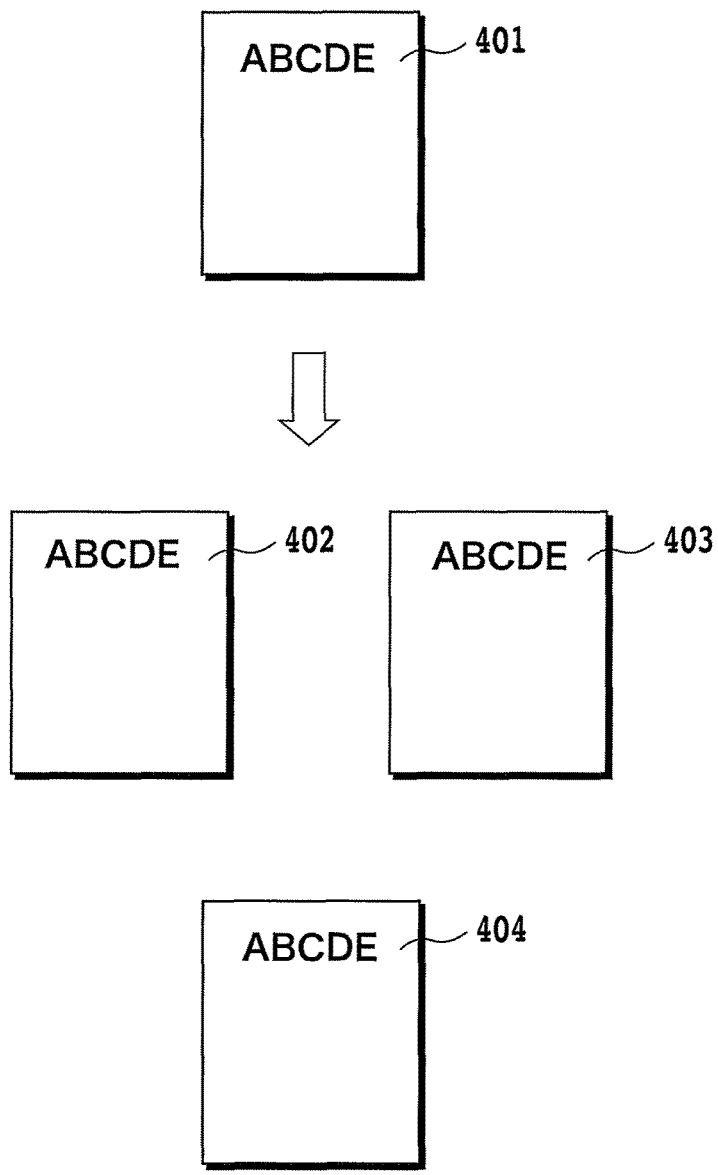
FIG. 4 illustrates an example of scanned image data according to the embodiment of the present invention.
Figure 5:
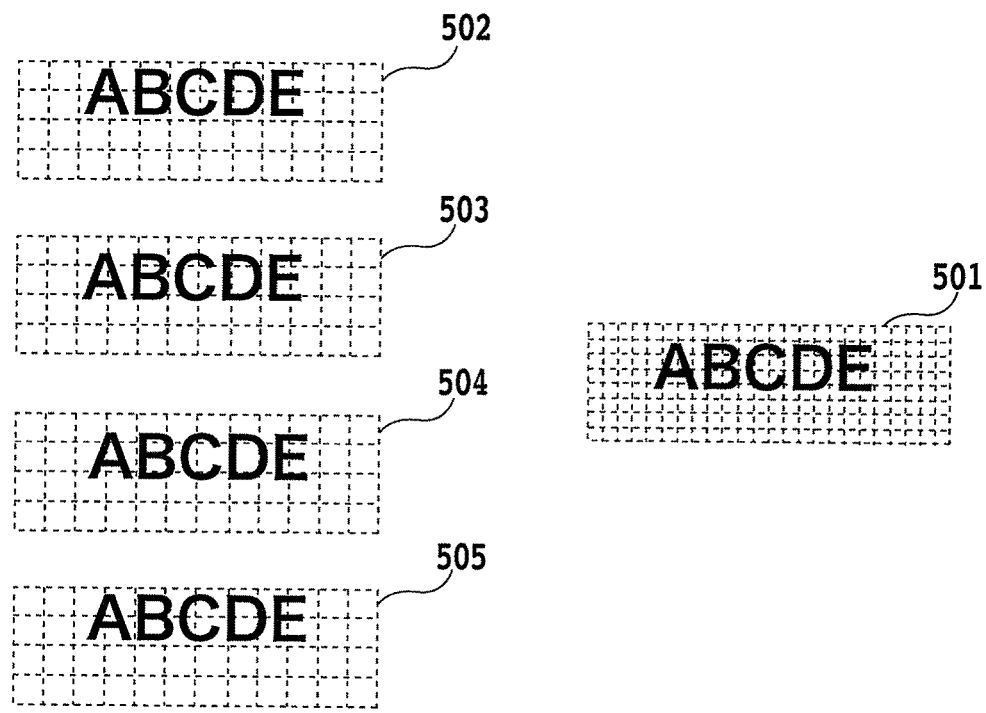
FIG. 5 illustrates another example of scanned image data according to the embodiment of the present invention.

FIG. 4 illustrates an example of image data obtained when a document is scanned by using sensors arranged in a tilt state as in FIG. 3. While, reference numeral 401 represents a document in which a letter of "ABCDE" is laterally written, reference numerals 402 to 404 represent image data read by the sensors, respectively. That is, the reference numeral 402 represents image data captured by the sensor 304, the reference numeral 403 represents image data captured by the sensor 305, and the reference numeral 404 represents image data captured by the sensor 306. FIG. 5 represents an example when the number of the sensors is four, in which slight phase shifts of each of images 502 to 503 with respect to a document 501 in the main-scanning direction and the sub-scanning direction are illustrated more clearly than in FIG. 4. In addition, a reference image such as the document 401 and the document 501, is referred to as a reference low-resolution image, and an image having phase shifts, such as the images 402 to 404, and the images 502 to 504, is referred to as an object low-resolution image.

As described-above, since sensors are tilted and apart from widely each other, image data as illustrated in FIGS. 4 and 5, having phase shifts every channel in the main-scanning direction and in the sub-scanning direction, can be obtained. If the phase shifts by a sub-pixel unit, a super-resolution image with high resolution can be acquired by carrying out super-resolution processing through the use of image data such as the image data 402 to 404 (or the image data 502 to 505). Furthermore, it is possible to cause the phase to shift by a sub-pixel unit by adjusting the gaps between each of the sensors and the angles of the sensors.

(Method for Causing Phase to Shift by a Sub-Pixel Unit)

Here, with reference to FIG. 6, a method for causing the phase to shift by a sub-pixel unit will be described in detail, further.

Reference numeral 601 represents an area sensing device corresponding to the image sensing element 213 in FIG. 2, and it is equivalent to a device, for example, a device including the sensors 301 to 303 in FIG. 3. Reference numeral 602 represents pixel sensors, which are configured so that 20 pixels are lined up in the main-scanning direction and 10 pixels are lined up in the sub-scanning direction.

Further, the area sensor 601 is mounted so as to be tilted with respect to a reference setting position in the main-scanning direction and in the sub-scanning direction. That is, the sensor 601 is installed so as to be tilted at an angle θ with respect to the line sensor installed in the area sensor at the bottom.

Positions of constituent pixel sensors are expressed by using the left end upper portion of the area sensor as an origin, the main-scanning direction as x direction, and the sub-scanning direction as y direction. That is, the coordinate (x, y) of the left end upper portion is (0, 0), and the coordinate (x, y) of the right end upper portion is (19, 0). Similarly, the coordinate (x, y) of the left end lower portion is (0, 9), and the coordinate (x, y) of the right end lower portion is (19, 9).

Reference numeral 603 represents a group of one line of pixel sensors, constituting the area sensor 601. The group 603 is configured with 20 pixel sensors constituting the main-scanning direction. That is, the group 603 is configured with pixel sensors each having coordinates of (0, 4), (1, 4), (2, 4), ..., and (19, 4), respectively. In addition, in the following description, the group 603 of one line of pixel sensors configured with a plurality of pixel sensors is referred to as a reading line sensor 603. Similarly, reference numeral 604 is configured with a group of pixel sensors each having coordinates of (0, 5), (1, 5), (2, 5), ..., and (19, 5), respectively. In the following description, the group 604 is referred to as a reading line sensor 604.

In the present embodiment, a document placed on the platen 204 is read by driving the document reading unit 205 including the image sensing element 213 (the area sensor 601) mounted on the reading device in the direction of an arrow illustrated in FIG. 2.

Figure 7A:
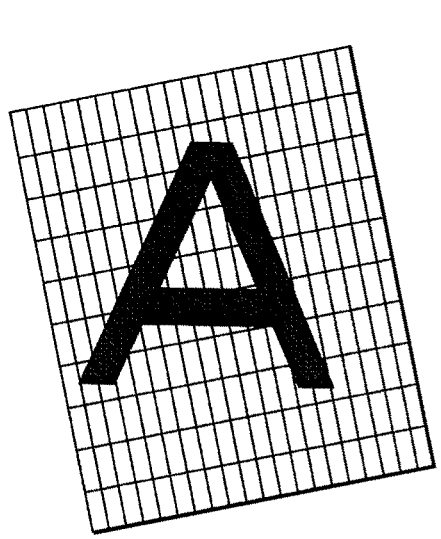
FIG. 7A and FIG. 7B illustrate examples of scanned image data read by the area sensing device according to the embodiment of the present invention.
Figure 7B:
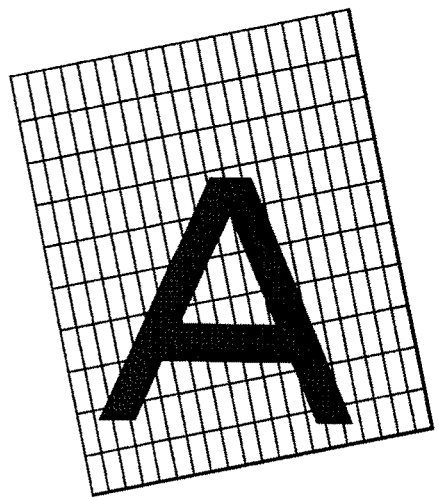

Finally, sheets of image data read by the line sensors 603 and 604 are sheets of data illustrated in FIGS. 7A and 7B, respectively, and both sheets of the data are read as image data that is tilted by an angle θ.

Figure 6:
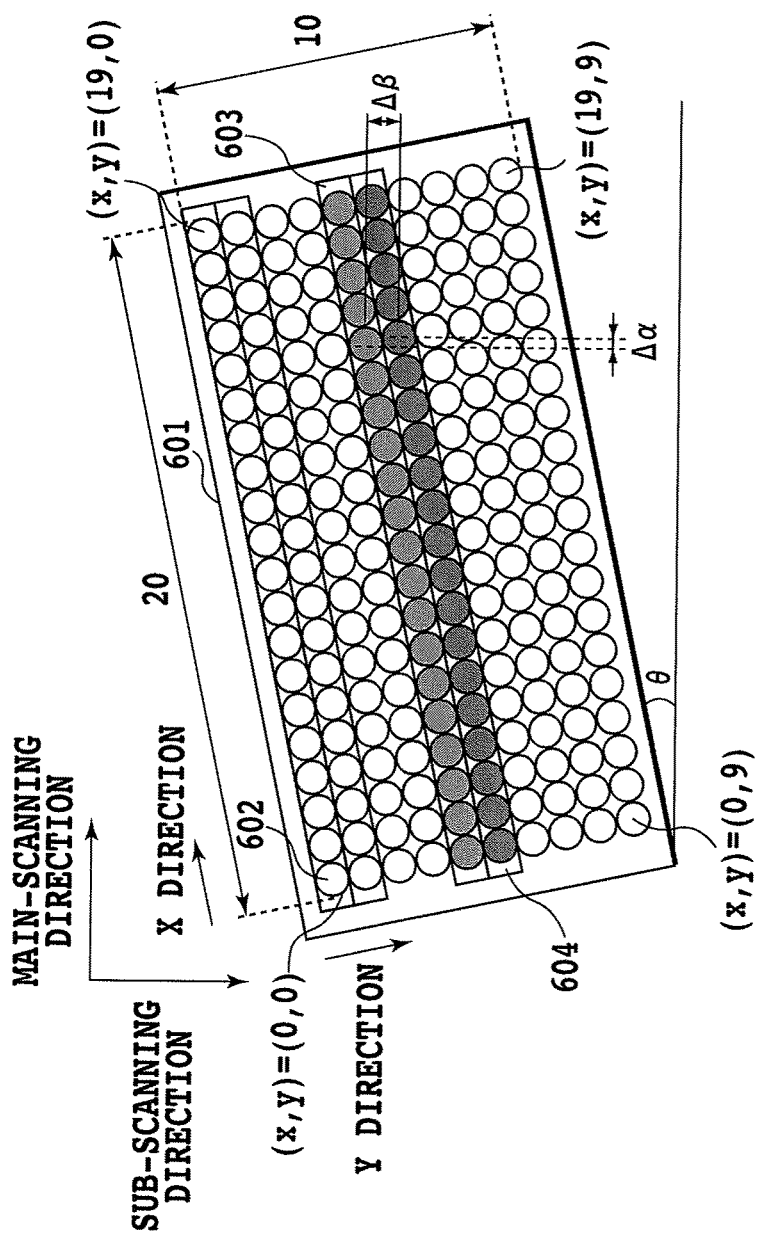
FIG. 6 illustrates an area sensing device corresponding to the image sensing element according to the embodiment of the present invention.

As illustrated in FIG. 6, the line sensor 603 is physically shifted with respect to the line sensor 604 by one pixel sensor. Therefore, there arises a phase shift between pixel sensors constituting the line sensor 603 and pixel sensors constituting the line sensor 604, in a horizontal direction.

For example, the y-position of a pixel sensor locating at coordinate of the line sensor 603; (x, y)=(15, 4) and that of a pixel sensor locating at coordinate of the line sensor 604; (x, y)=(15, 5) shift each other by the amount of y=1. This shift causes a shift in the sub-scanning direction by an amount of Δβ.

On the other hand, their x-positions are completely the same; x=15. However, if viewed from the main-scanning direction before tilting the entire area sensor (that is, the horizontal direction), there is a phase shift between the two x positions by a minute amount of Δα (within a sub-pixel order) due to the tilt angle θ. That is, even if two pixel sensors in the line sensor have the same position in x direction, a minimum unit phase shift depending on the tilt angle θ occurs in the horizontal direction that is the main-scanning direction, by tilting the area sensor.

Accordingly, there is a different phase shift between image data read by each of line sensors, arranged in the area sensor 601 and having the same resolution. Specifically, there is a phase shift between read image data of FIG. 7A and that of FIG. 7B, not only by the amount of $\Delta\beta$ in the sub-scanning direction but also by the amount of $\Delta\alpha$ in the main-scanning direction.

Although, the relationship between the two line sensors (603 and 604) has been described here, it is needless to say that the above-mentioned relationship is satisfied between each of all line sensors constituting the area sensor 601.

Furthermore, the number of the line sensors can also be increased by increasing the number of the pixel sensors constituting the area sensor 601 in x direction.

The number of the line sensors constituting the area sensor 601 is equal to the number of read image data obtained by single reading operation. That is, if 30 lines of line sensors are arranged in the area sensor 601, 30 sheets of read image data each having a different phase shift can be obtained by single reading control.

As mentioned-above, by tilting the area sensor, it is possible to acquire sheets of image data by a plurality of line sensors adjacent to the sub-scanning direction by single scanning of a document, and to obtain a plurality of image data in which phase shift in the main-scanning direction is smaller than one pixel.

Figure 8:
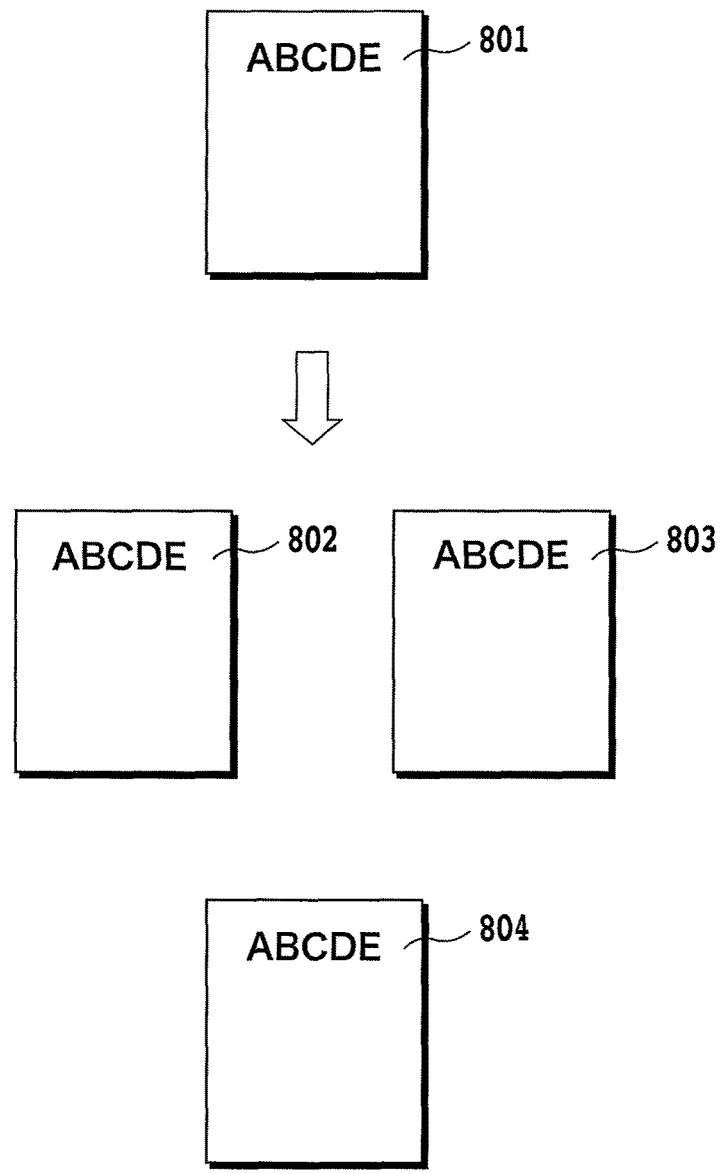
FIG. 8 illustrates an example of a case where affine transformation is carried out with respect to image data according to the embodiment of the present invention.

FIG. 8 illustrates an example when affine transformation is carried out with respect to the image data captured in the case of FIG. 4. Reference numerals 802, 803 and 804 represent images obtained by carrying out affine transformation with respect to the images 402, 403 and 404, respectively. By carrying out affine transformation, a plurality of images, being horizontal with respect to the document and having sub-pixel phase shifts in the main-scanning direction and in the sub-scanning direction, can be obtained.

Figure 9:
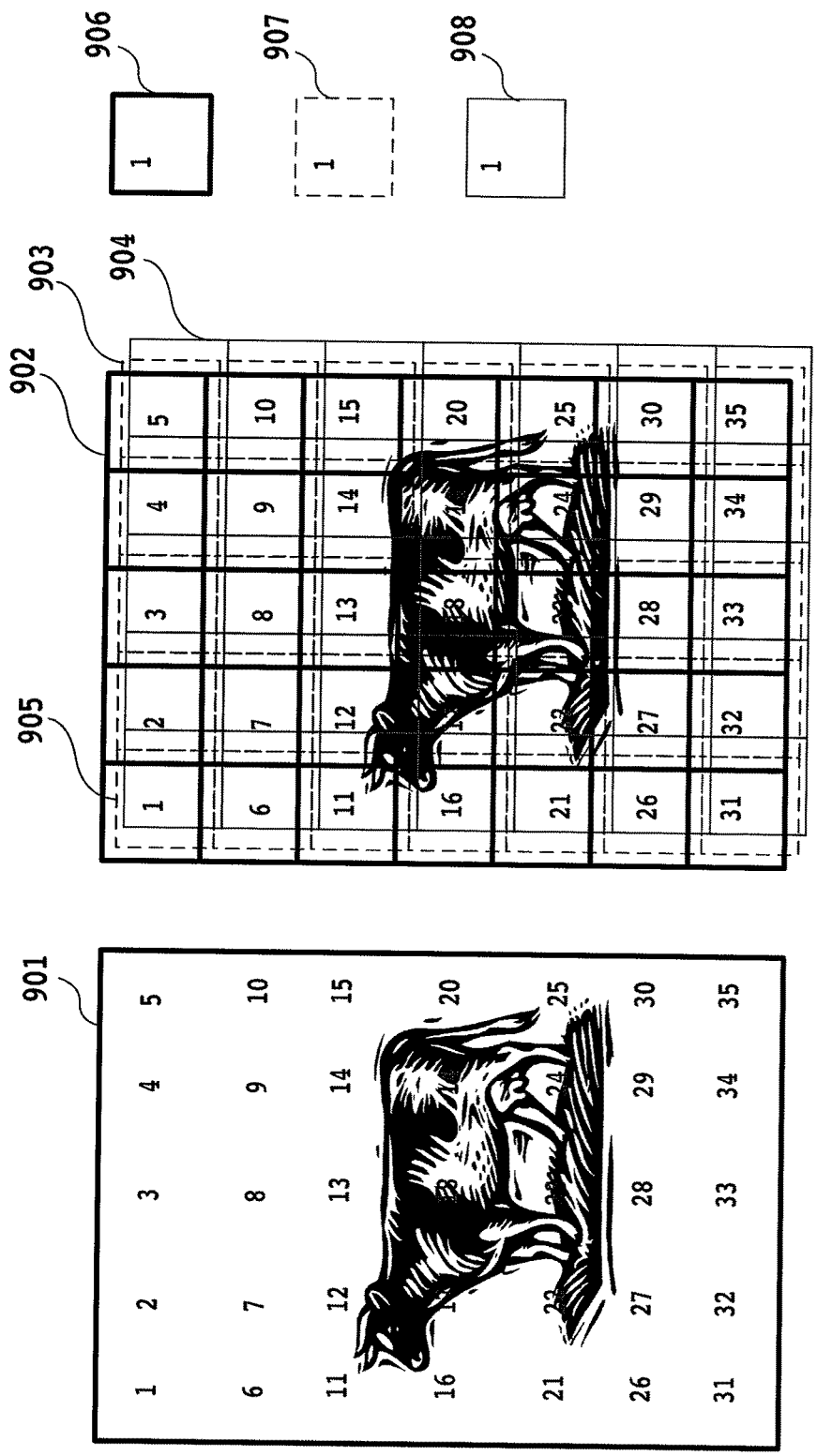
FIG. 9 illustrates an example of a case where block division is carried out with respect to image data according to the embodiment of the present invention.

FIG. 9 illustrates an image obtained by reading a document 901, as in FIG. 4 or FIG. 5, in which a cow is drawn and by dividing the resultant image data into 35 blocks. If reference numeral 902 is defined as an image which is made by dividing the document 901 into 35 blocks (i.e.; a reference low-resolution image), reference numerals 903 and 904 are images having sub-pixel phase shifts with respect to the image 902 (i.e.; object low resolution images). A block 905 represents the first block of the divided images. Reference numeral 906 represents an image made by taking only the first block 905. Similarly, reference numerals 907 and 908 represent the first block contained in the images 903 and 904, respectively, having sub-pixel phase shifts with respect to the image 902.

Figure 10:
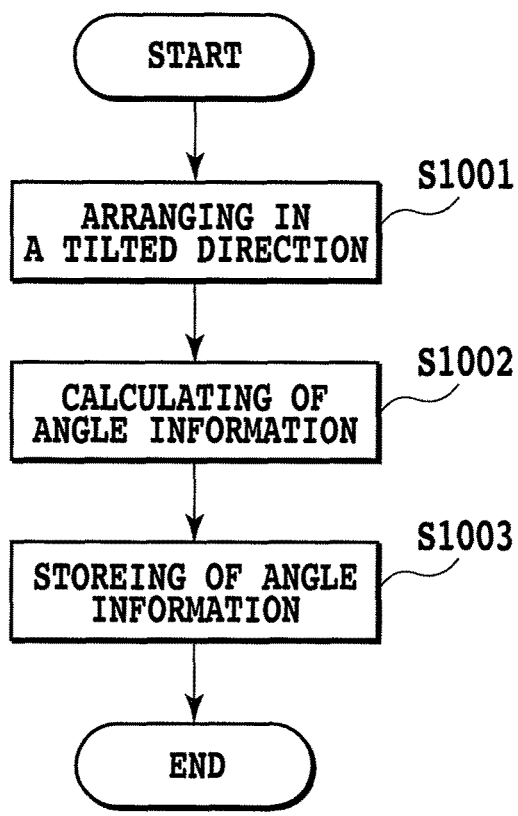
FIG. 10 is a flowchart illustrating the process flow of installing sensors according to the embodiment of the present invention.

FIG. 10 illustrates a process flow at the time of installing sensors in a tilted position. First, at Step 1001, the sensors are arranged in a tilt position. Next, at Step 1002, extent of tilting the linear sensors is calculated. Any method may be used for calculating the tilt angle. Then, at Step 1003, the calculated angle is stored on a memory as angle information. The angle information stored in this manner is referred to on affine transformation for correcting the tilting of image data.

(Processing of Outputting Resultant Image by subjecting the Image to Image Processing)

Next, the process flow according to the present embodiment from the generation of a super-resolution image having high resolution by using a plurality of image data each having a phase shift and acquired as mentioned above, to outputting the resultant super-resolution image by subjecting the image to suitable image processing, will be described with reference to the flowchart in FIG. 11.

Here, the case including the steps of: scanning a document at resolution of 300 dpi; subjecting the read image to super-resolution processing via block division and affine transformation; subjecting the resultant super-resolution image to image processing; and finally outputting an image of 1200 dpi, will be described as an example. It is obvious that the resolution of the finally output high resolution image is not limited to 1200 dpi, the present embodiment can be applied to any resolution if image processing is carried out after the resolution is improved by using super-resolution processing.

Moreover, in the present embodiment, since a plurality of image data each having a phase shift is obtained using sensors installed in a tilted position, affine transformation is carried out. However, in a configuration in which a plurality of image data each having a phase shift is obtained by using sensors installed not in a tilted position, control similar to that of the present embodiment is possible without carrying out affine transformation.

First, at Step 1101, modes such as resolution at the time of reading a document, magnification ratio and resolution at the time of outputting a final image and other various application functions, are set. This mode setting is carried out by a user operation via an input device 106 provided in the MFP.

Next, at Step 1102, the image reading component 101 scans a document to obtain image data.

Then, at Step 1103, the block division component 1201 carries out the above-described block division with respect to the resultant image data. During this processing, it is optional into what blocks the image data is divided and thus, it is possible to divide the data into blocks having arbitral number of pixels in the lateral and the vertical directions. Moreover, it is also possible to subject the image data obtained to next processing as is without dividing it into blocks. In the present embodiment, three sheets of image data each having sub-pixel phase shifts, are treated. That is, three sheets of image data each having sub-pixel phase shifts are obtained by single scanning. Of course, the number of sheets of image data each having phase shifts can be optionally set, and thus, the number is not limited to three.

At this stage, the resultant image data is in a tilted position. Therefore, at Step 1104, affine transformation is performed. That is, the tilt correction component 1202 corrects the tilted image data to be horizontal image data. In carrying out the correction, the angle information stored at Step 1003 in FIG. 10 is used. In addition, as for a method for correcting tilting of image data, it is not limited to use affine transformation, and well known methods that can achieve similar objects can also be used. By using affine transformation, image data, in which tilting is corrected, but still having sub-pixel phase shifts in the main-scanning direction and in the sub-scanning direction, can be acquired. The image data in which tilting is corrected is stored on a memory.

In parallel with the each processing at Step 1102 to Step 1104, a super-resolution processing component 1203 carries out determination processing of target sheet number for acquiring predetermined resolution (Step 1105 and Step 1106). That is, processing of determining the number of sheets of image data necessary for super-resolution processing is carried out for acquiring resolution suitable for each image processing. In the present embodiment, as shown in Step 1111 to Step 1113 of the latter stage, the case where three kinds of image processing A, B and C (content of each processing will be described later) are carried out, will be described. The content of image processing to be carried out is determined depending on, for example, mode setting. Although, in the present embodiment, only a single image processing component 1204 is illustrated (FIG. 12), the image processing component 1204 may also have a configuration including a plurality of image processing components according to the content of image processing.

First, at Step 1105, target resolution during carrying out super-resolution processing is acquired. Specifically, while referring to a table stored on the storage device 102 such as one illustrated in FIG. 13, and referring to information of resolution to be output finally, preferable resolution is acquired as target resolution for each image processing. As is clear from the table in FIG. 13, each image processing is associated with specific resolution suitable for the processing, resolution is set step by step depending on the priority class. In addition, columns in the table having no specific number thereon are dealt as a default value (for example, 600 dpi etc.) common to all kinds of image processing being input thereon, for example. For example, at class 1 of priority, the image processing A is associated with 600 dpi, the image processing B is associated with 1200 dpi, and the image processing C is associated with 1200 dpi, respectively. According to the present embodiment, the resolution of the final output is 1200 dpi. Thereby, class 1 of priority is applied to this case, and 600 dpi (for image processing A), 1200 dpi (for image processing B), and 1200 dpi (for image processing C) are acquired as target resolution, respectively. If the resolution of the final output is 600 dpi, it is not necessary to carry out image processing at 1200 dpi, and thus the target resolution of class 2 priority can be acquired.

Next, at Step 1106, based on the acquired target resolution, target number of image data necessary for carrying out super-resolution processing is determined for each target resolution. For this determination of the target number, for example, a table as illustrated in FIG. 14 is used. In the example of the table in FIG. 14, a plurality of settings A to C are prepared in advance, and the target number can be selected among them. In addition, the selection may be carried out in each case via, for example, UI, or it may be automatically carried out by a predetermined condition. Suppose that setting A is selected in the present embodiment. Accordingly, three for the case of 600 dpi and six for the case of 1200 dpi are determined as the target number of image data necessary for super-resolution processing.

Upon the completion of processing with respect to image data obtained by first scanning till affine transformation (Step 1102 to Step 1104), and upon the completion of determination processing of target number of sheets (Step 1105 and Step 1106), process advances to Step 1107.

At Step 1107, the super-resolution processing component 1203 confirms the number of image data each having a different phase and read practically by the image reading component 101 by scanning a document, that is, the number of image data stored on a memory. If the number of sheets confirmed here reaches any of the target numbers determined at Step 1106, super-resolution processing toward resolution corresponding to the reached target number is started. Specifically, at Step 1108, whether there is any that has reached the determined target numbers is determined, and if the presence is determined, process advances to Step 1109 and super-resolution processing toward resolution of the reached target number is started. If there is no number that has reached any of the target numbers, process returns to Step 1102. At Step 1102, the image reading component 101 carries out the next reading operation.

According to the present embodiment, the target number of image data each having a different phase that is necessary for obtaining resolution suitable for image processing A is three, and the number read by single scanning is also three. Accordingly, by the first scanning, the number of image data has reached three that is the target number. Therefore, in determination at Step 1108, process does not return to Step 1102 and advances to Step 1109. That is, it is determined that super-resolution processing can be started for the case of target resolution of 600 dpi. As described-above, according to the present embodiment super-resolution processing is started at the time when the number of image data required for obtaining specific resolution (associated with image processing) is obtained.

At Step 1109, super-resolution processing for target resolution is performed. That is, the super-resolution processing component 1203, by using three sheets of image data (300 dpi), each having a different phase and stored on a memory, performs super-resolution processing toward 600 dpi that is suitable for image processing A.

(Description of Super-Resolution Processing)

Figure 15:
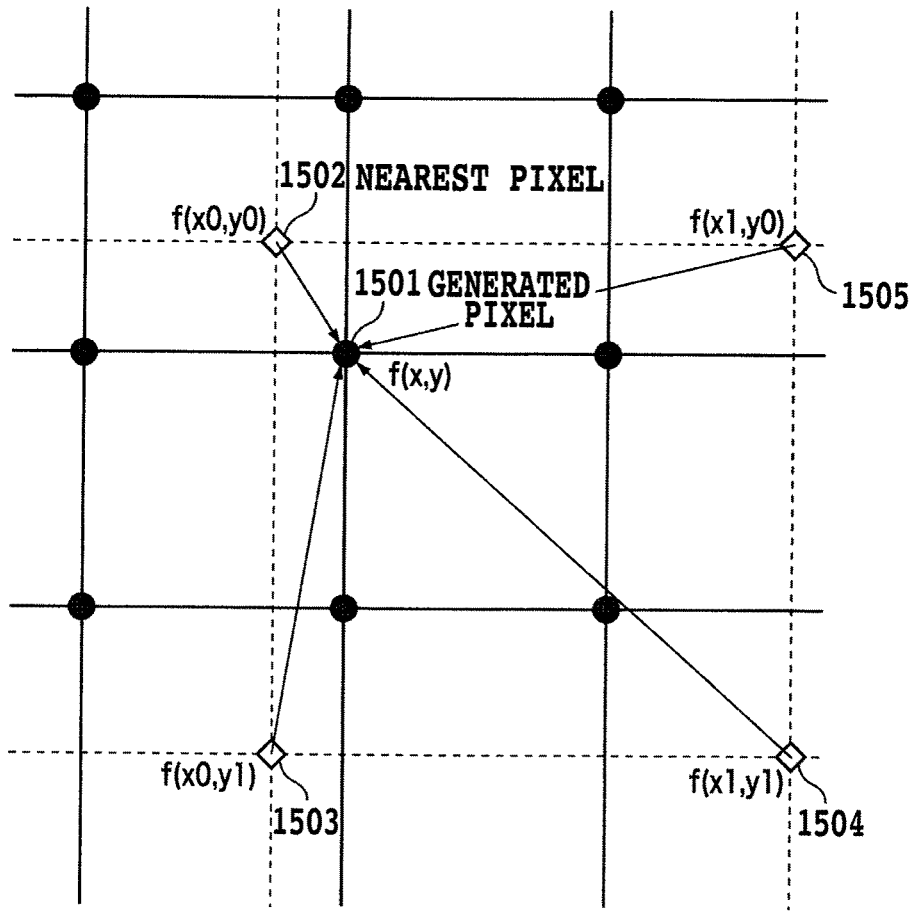
FIG. 15 is a detailed view describing super-resolution processing according to the embodiment of the present invention.

Here, with reference to FIG. 15, super-resolution processing will be described in detail.

As described-above, there occur sub-pixel order phase shifts in the main-scanning direction and in the sub-scanning direction between each of the plurality of image data read by the area sensor. Accordingly, there exist a pixel that does not exist both in the reference low-resolution image data and in the target low-resolution image data among the respective pixels constituting a super-resolution image generated by subjecting an image to super-resolution processing (hereinafter, referred to as "generated pixels").

For such pixels, a predetermined interpolation processing is performed by using pixel data representing pixel values of pixels present around the generated pixels, so as to increase resolution while performing synthesis. As the interpolation processing, the processing such as bilinear method, bicubic method, nearest-neighbor method, and the like can be used.

For example, when interpolation processing by the bilinear method is used, first, a nearest pixel 1502 that is the nearest to the position of the generated pixel 1501 is extracted from the reference low-resolution image data and the target low-resolution image data. Then, from the target low-resolution image in FIG. 15, four pixels surrounding the position of the generated pixel are determined as surrounding pixels 1502 to 1505. Then, a predetermined weight is added to the data values of the surrounding pixels, the data values are averaged, and a data value of the generated pixel is obtained by the following formula:

$$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$$

By repeating the above processing for each position of the generated pixels, a super-resolution image can be obtained. Furthermore, the more data values of the low-resolution image are used for the interpolation processing, the more precise super-resolution image can be obtained.

Figure 11:
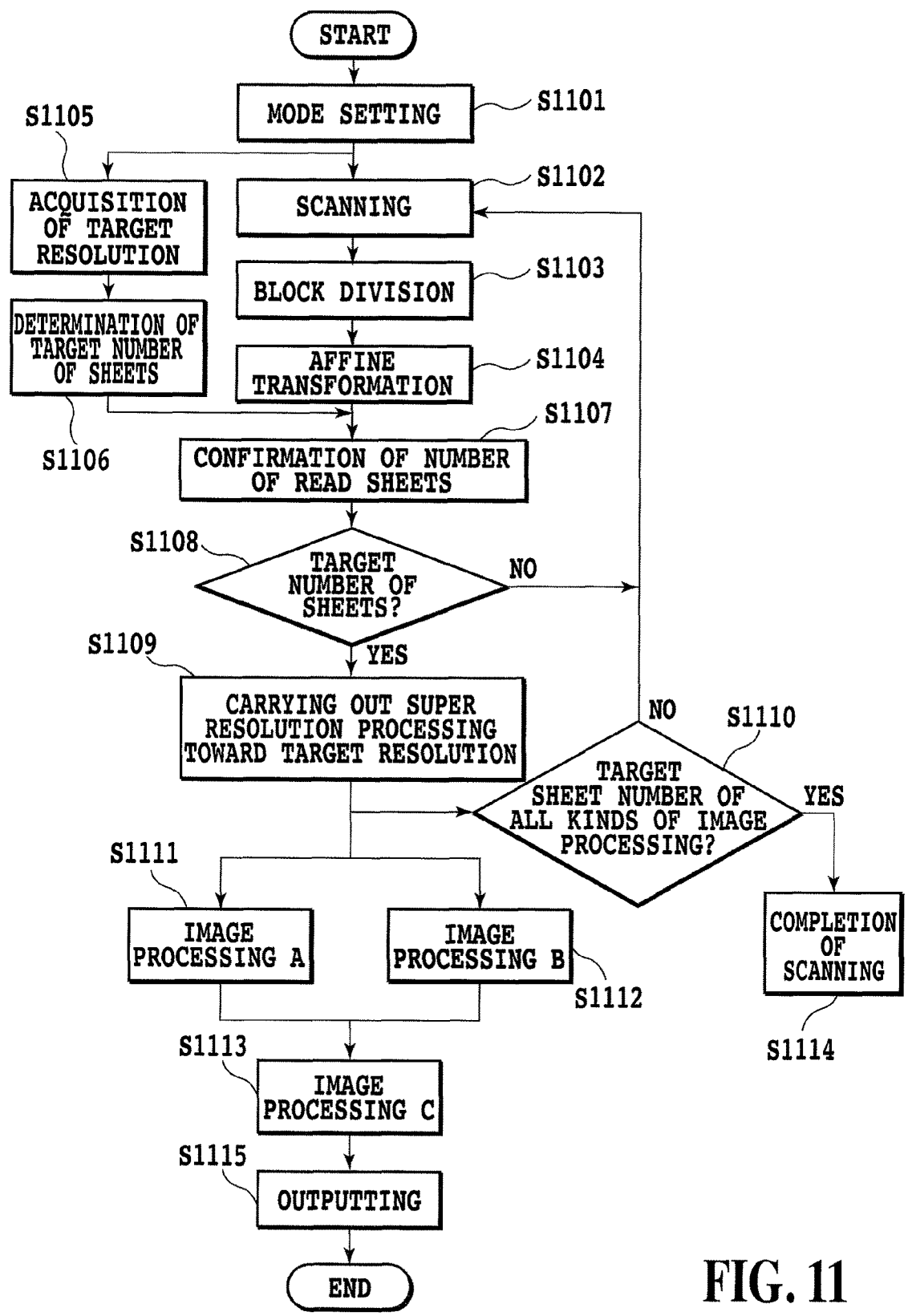
FIG. 11 is a flowchart illustrating the process flow from scanning to outputting according to the embodiment of the present invention.

Now, returning to the description of the flowchart in FIG. 11, when super-resolution processing toward 600 dpi is executed and completed at Step 1109, process advances to image processing A (Step 1111). That is, image processing A is started without waiting completion of super-resolution processing toward 1200 dpi. Moreover, process also advances to Step 1110 in parallel. In addition, super-resolution processing toward 1200 dpi is not performed at this stage, and, for image processing B, since an image is obtained at the target resolution of 1200 dpi (Step 1105), process does not advance to Step 1112 (image processing B).

At Step 1111, the image processing component 1204 carries out image processing A, that is, area separation processing and color/monochrome determination processing with respect to super-resolution image data subjected to super-resolution processing from 300 dpi to 600 dpi. Here, area separation processing is referred to as processing of separating raster image data into a plurality of areas such as letters, figures, and images.

As mentioned-above, according to the present embodiment, upon completion of super-resolution processing at resolution corresponding to a certain target number of sheets, image processing with respect to the super-resolution image subjected to the super-resolution processing is started immediately. The image processing started here, is image processing associated with resolution corresponding to the target sheet number that is determined whether the target number of sheets at Step 1108 is reached.

In addition, with respect to the super-resolution image data subjected to image processing A, image processing C is performed further (Step 1113).

On the other hand, at Step 1110, it is determined whether target number of sheets satisfying all kinds of target resolution is reached or not. According to the present invention, since the target sheet number for 1200 dpi is six, not all the completion conditions are satisfied at the stage in which three sheets of image data are stored on a memory. Accordingly, process returns to Step 1102, where the image reading component 101 carries out second scanning. When the second scanning is completed, and new three sheets of image data each having a different phase are stored on the memory via block division and affine transformation of the scanned image, the number of read sheets is confirmed, again (Step 1107). Since the target sheets number of six for 1200 dpi is reached at this stage, super-resolution processing toward 1200 dpi is performed (Step 1109). That is, super-resolution processing is performed by using six sheets of image data each having a different phase. Then, according to the present embodiment, since there is no image processing in which most preferable results of processing can be obtained at resolution (for example, 1200 dpi) higher than 1200 dpi, it is determined that all of the target sheet numbers are reached, and reading is completed (Step 1114).

Upon completion of super-resolution processing toward 1200 dpi at Step 1109, process advances to image processing B (Step 1112). At Step 1112, the image processing component 1204 carries out image processing such as color space transformation processing and error diffusion processing, with respect to a super-resolution image subjected to super-resolution processing from 300 dpi to 1200 dpi. Here, color space transformation processing is referred to as processing of transforming data represented by RGB color space into data represented by color space of CMYK or YUV, based on correlation between each of colors, or the reverse processing. Super resolution image data subjected to image processing B will be further subjected to image processing C (Step 1113). In addition, although upon completion of super-resolution processing toward 1200 dpi, an super-resolution image suitable for image processing C is obtained, according to the present invention image processing C includes synthesizing processing of image data subjected to both of image processing A and image processing B. Accordingly, image processing C is not performed until completion of the both image processing (that is, completion of image processing B).

Figure 16:
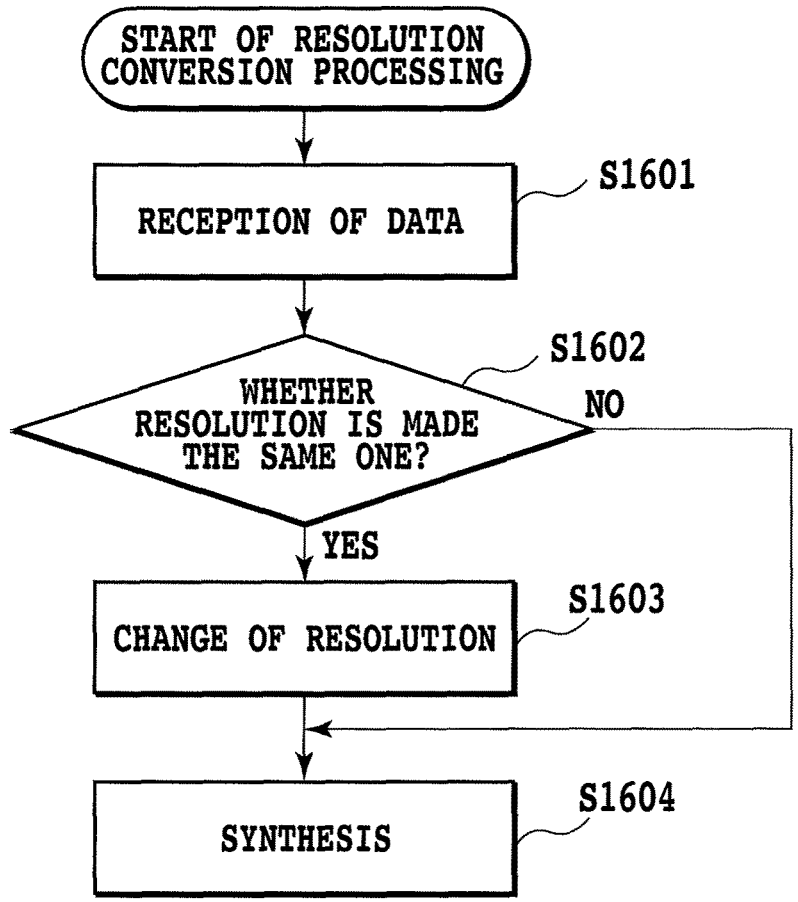
FIG. 16 is a flowchart illustrating the flow of synthesizing processing according to the embodiment of the present invention.

After completion of image processing A and image processing B at Step 1111 and Step 1112, at Step 1113, synthesizing processing of image data is performed. Specifically, an image is synthesized by using both sheets of super-resolution image data of 600 dpi subjected to image processing (image processing A) first, and super-resolution image data of 1200 dpi subjected to image processing (image processing B) later. As described above, in some times, the sheets of image data each having a different resolution may be input in image processing C. Contents of this processing will be described with reference to the flowchart in FIG. 16.

First, at Step 1601, the super-resolution image data of 600 dpi subjected to image processing A and the super-resolution image data of 1200 dpi subjected to image processing B are received, respectively. Then, at Step 1602, it is determined whether the resolution of one side should be the same as that of the other. At this time, it is possible to perform programming automatically in advance so as to set both of the resolution to be the same one if both of them are different from each other, or it is possible for a user to select whether both of the resolution should be the same one via a UI.

When it is determined that both of the resolution should be the same one, at Step 1603, resolution of either one of super-resolution image sheets is subjected to resolution conversion processing. In addition, to which one of the super-resolution image sheets is subjected to resolution conversion processing may be determined automatically by programming in advance so as to set the resolution to be the higher one or lower one of them, or may be selected by a user via the UI. Then, either one of them is subjected to resolution conversion processing so that both of the super-resolution image data have the same resolution, and an image is synthesized by using them (Step 1604).

When determined that resolution of both image data sheets should not be the same one at Step 1602, process advances to Step 1604 immediately, and an image will be synthesized.

In image synthesis, for example, based on the area judged signals generated by area separation processing in image processing A, a plurality sheets of super-resolution image data are synthesized on one page for each pixel.

Furthermore, as the contents of image processing C, screen processing that generates a color tone with the number and the density of color points (color lines) or the like may be performed.

After the completion of image processing C at Step 1113 as mentioned-above, at Step 1115, super-resolution image data of 1200 dpi subjected to all kinds of image processing is output.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-333991, filed Dec. 26, 2008, which is hereby incorporated by reference herein in its entirety.

What is claimed is:
1. An image processing apparatus, comprising:
a document reading unit configured to read a plurality of image data each having a different phase from a document by single scanning;
a super-resolution processing unit configured to generate super-resolution image data by using the plurality of image data each having a different phase, so as to have a super-resolution higher than those of the plurality of image data; and an image processing unit configured to carry out multiple image processing to the super-resolution image data, wherein each of the multiple image processing is associated with a specific resolution; and wherein the super-resolution processing unit starts super-resolution processing at the time when image data necessary for obtaining the specific resolution associated with any of the multiple image processing is obtained.

2. The image processing apparatus according to claim 1, wherein the super-resolution processing unit determines a target number of sheets necessary for carrying out the super-resolution processing by obtaining the specific resolution, for each of the obtained resolution, and confirms the number of sheets of image data each having a different phase and read by the image reading unit, and when the confirmed number reaches any of the determined target sheet numbers, starts the super-resolution processing to a resolution corresponding to the reached target number.

3. The image processing apparatus according to claim 2, wherein the image processing unit, upon completion of the super-resolution processing, starts image processing associated with the resolution corresponding to the reached target number of sheets to super-resolution image data subjected to the super-resolution processing.

4. The image processing apparatus according to claim 1, wherein the multiple image processing includes processing of synthesizing image data, and the processing of synthesizing image data synthesizes super-resolution image data subjected to image processing first and super-resolution image data subjected to image processing later.

5. The image processing apparatus according to claim 4, wherein the processing of synthesizing image data, when a resolution of one of the super-resolution image data subjected to the image processing differs from that of the other of the super-resolution image data subjected to the image processing, is carried out by causing both resolutions to be the same one.

6. A method of image processing, the method comprising the steps of:

reading a plurality of image data each having a different phase from a document by single scanning;

generating super-resolution image data by using the plurality of image data each having a different phase, so as to have a super-resolution higher than those of the plurality of image data; and carrying out multiple image processing to the super-resolution image data, wherein each of the multiple image processing is associated with a specific resolution, and wherein the step of generating super-resolution image data is started at the time when image data necessary for obtaining the specific resolution associated with any of the multiple image processing is obtained.

7. A non-transitory computer-readable storage medium storing a program which when executed by a computer, causes the computer to carry out an image processing method comprising the steps of:

reading a plurality of image data each having a different phase from a document by single scanning;

generating super-resolution image data by using the plurality of image data each having a different phase, so as to have a super-resolution higher than those of the plurality of image data; and carrying out multiple image processing to the super-resolution image data, wherein each of the multiple image processing is associated with a specific resolution, and wherein the step of generating super-resolution image data is started at the time when image data necessary for obtaining the specific resolution associated with any of the multiple image processing is obtained.

* * * * *